Figure 1:
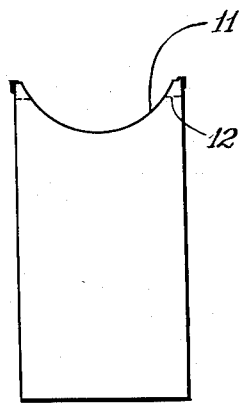

April 30, 1963     J. F. ACKERMAN ETAL     3,087,824
METHOD OF PACKAGING BEVERAGES AND CONTAINERS THEREFOR Filed Oct. 31, 1958

INVENTORS.
Edward C. Haskell
Joseph F. Ackerman
BY

United States Patent Office 3,087,824
Patented Apr. 30, 1963

3,087,824
METHOD OF PACKAGING BEVERAGES AND CONTAINERS THEREFOR
Joseph F. Ackerman, Fort Thomas, Ky., and Edward C. Haskell, Cincinnati, Ohio, assignors to Interchemical Corporation, New York, N.Y., a corporation of Ohio
Filed Oct. 31, 1958, Ser. No. 771,071
4 Claims. (Cl. 99—182)

This invention relates to improvements in the art of packaging beverages, especially malt beverages such as beer and ale.

Malt beverages, such as beer and ale are conventionally packed in twelve or thirty-two ounce bottles or cans and in larger barrels or kegs. The art has long recognized that beer that has been packaged in cans and stored for six to eight weeks develops an off flavor taste and for this reason is inferior to bottled beer that has been stored for the same period of time. This development of undesirable taste or flavor has generally been considered to be due to very complex chemical changes. One of the major factors that has been thought to be related to the stability differences between bottled beer and canned beer is the accumulation of iron ions in beer that has been stored in cans. It can be shown for instance, that canned beer, after a certain length of time, has a higher concentration of iron ions than bottled beer that has been stored for the same length of time.

Because of the general belief that flavor retention characteristics are related to iron ion content many attempts have been made to prevent iron ion accumulation in canned beer, e.g. U.S. Patent No. 2,797,023. This patent is typical of the great effort that has been made heretofore to develop coatings for the insides of beer cans which will prevent the dissolution of iron in the beer. As a result of this effort, coatings which limit iron ion accumulation to 0.5 part per million or less, have become standard in the industry. However, even though such improvements have been made in the coatings, canned beer still develops an off flavor taste.

The present invention is based on our startling discovery that the accumulation of iron ions in canned beer is not a major factor contributing to development of off flavor in the beer. On the other hand we have definitely shown that off flavor in canned beer is caused to a very large extent by the relatively large interfacial area between the beer and the headspace, or gas filled space above the beer. This explains why a bottle of beer aged on its side will develop an off flavor taste compared with a bottle aged in conventional upright position. The bottled beer aged on its side has a relatively large interfacial area between the beer and the space above it and develop a distinct off flavor taste compared to the bottled beer that is aged in conventional upright position. Also it is found that the iron ion content of the beer aged on its side is substantially the same as the iron ion content of the beer aged in an upright position. In general the interfacial area in a can of beer is about five times the interfacial area in bottled beer.

One embodiment of our invention, therefore, consists of a method of packaging beer in cans in such manner as to greatly reduce the interfacial area between the beer and the head space above the beer. If this interfacial area is reduced to the point that it is substantially the same as it is in a bottle of beer, then flavor retention characteristics comparable to those for bottle beer are obtained. Preferably the cans will be coated inside in conventional manner to keep the iron ion accumulation to a minimum, i.e. 0.5 part per million or below.

Another important aspect of the invention is a specially designed beer can that will make it possible to can beer with relatively small interfacial area between the beer and the headspace. Several specific designs are possible. For example, the top of the can may be depressed in its center so that when the can is filled to a level sufficient to insure that the depressed top extends into the beer, it thus reduces the interfacial area. This embodiment is illustrated in FIGURE 1 where the depressed top is illustrated at 11 and the fill level of the beer is illustrated at 12. Obviously both ends of the can could be depressed and then the beer could be stored on either end and still retain its flavor.

Figure 2:
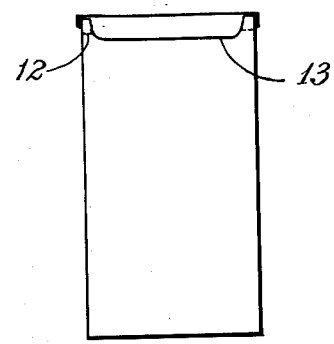

Another design of a specially designed can is illustrated in FIGURE 2 where a diaphragm 13 of a flexible film such as aluminum foil, Saran (polyvinylidene chloride) film, polyethylene film and the like is seamed into the end of the can in such a way as to eliminate entirely the interfacial area in contact with the beer by separating the beer from the headspace with films of these materials.

Figure 3:
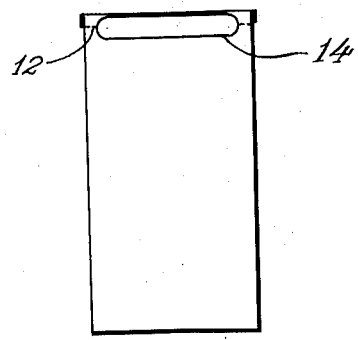

In another embodiment of the invention the interfacial area between the beer and the headspace is effectively reduced by floating gas-filled pouches of polyethylene film, Saran film, aluminum foil or foamed polystyrene. A can of beer that has been filled in this manner is illustrated in FIGURE 3 where the floating pouch 14 contacts a substantial portion of the surface of the beer and thus prevents the surface of the beer from contacting the space above the beer. Obviously, if the can is completely filled except for the space occupied by the pouch, the interfacial area between the surface of the beer and the headspace is completely eliminated.

We claim:
1. A method of improving the flavor retention characteristics of canned beer which consists in reducing the interfacial area between the beer and the headspace in the can by providing at least one can end with a depressed center portion, the depressed portion extending into the beer and reducing the interfacial area between the beer and the headspace when the depressed can end is the top of the can.

2. A method for improving the flavor retention characteristics of canned beer which consists in reducing the interfacial area between the beer and the headspace in the can by providing the can with a top end having a substantial portion of its inner surface submerged below the surface of the beer, the submerged portion being the center of the top.

3. A method of improving the flavor retention characteristics of canned beer which consists in reducing the interfacial area between the beer and the headspace in the can by floating a gas filled pouch on the surface of the beer and thus substantially eliminating the interfacial area between the beer and the headspace.

4. A method for improving the flavor retention characteristics of canned beer which consists in providing the top of the can with a sealed-in flexible film over a substantial portion of its inside area, said flexible film being in contact with the beer over a substantial portion of its area and thus substantially eliminating the interfacial area between the beer and the headspace.

(References on following page)

References Cited in the file of this patent
UNITED STATES PATENTS

| | | | |
|---|---|---|---|
| 45,406 | Hammer | Dec. 13, 1864 |
| 96,871 | Blanchard | Nov. 16, 1869 |
| 149,408 | Langellier | Apr. 7, 1874 |
| 536,870 | Gilchrist | Apr. 2, 1895 |
| 1,284,751 | Mussino | Nov. 12, 1918 |
| 1,378,531 | Fenn | May 17, 1921 |
| 1,818,924 | Basmadjian | Aug. 11, 1931 |
| 2,046,609 | Clark | July 7, 1936 |
| 2,124,959 | Vogel | July 26, 1938 |
| 2,126,212 | Richards | Aug. 9, 1938 |
| 2,521,397 | Muller | Sept. 5, 1950 |
| 2,816,687 | Phillips | Dec. 17, 1957 |